United States Patent [19]

Marquis et al.

[11] Patent Number: 4,845,646

[45] Date of Patent: Jul. 4, 1989

[54] HANDHELD DIGITAL GEMSTONE MEASUREMENT APPARATUS

[75] Inventors: Joseph Marquis, Londonderry, N.H.; Philip Lichtman, Newton, Mass.

[73] Assignee: Diamond Guard Corporation, Hudson, N.H.

[21] Appl. No.: 162,695

[22] Filed: Mar. 1, 1988

[51] Int. Cl.⁴ ............................................. G06F 15/32
[52] U.S. Cl. ..................................... 364/560; 33/504; 33/784; 33/819
[58] Field of Search ................ 33/504, 143 L, 147 M, 33/125 A, 166; 364/560, 715

[56] References Cited

U.S. PATENT DOCUMENTS

| | | | |
|---|---|---|---|
| 3,649,820 | 3/1972 | Totsuka et al. | 33/143 L |
| 4,035,922 | 7/1977 | von Voros | 33/143 L |
| 4,205,449 | 6/1980 | Waszmer | 33/147 N |
| 4,229,883 | 10/1980 | Kobashi | 33/143 L |
| 4,255,861 | 3/1981 | Nakata et al. | 33/166 |
| 4,570,349 | 2/1986 | Finkelman et al. | 33/143 M |
| 4,612,656 | 9/1986 | Suzuki et al. | 377/24 |

Primary Examiner—William D. Martin, Jr.
Attorney, Agent, or Firm—Wolf, Greenfield & Sacks

[57] ABSTRACT

A digital gemstone measurement device includes a first caliper jaw fixed to a housing, a second caliper jaw movable relative to the first caliper jaw, an encoding wheel that rotates in response to linear motion of the second caliper jaw, a photosensor for sensing rotation of the encoding wheel and a microcomputer responsive to photosensor output signals for calculating the weight of a gemstone. A slotted rotary encoding wheel provides measurement resolution on the order of 0.01 millimeter. A spring-loaded pneumatic dashpot urges the caliper jaws together relatively slowly so as to avoid snap-action. The gemstone shape is selected from a list, and the weight is calculated from a predetermined formula corresponding to the shape. The device is handheld and includes a keypad for controlling operation and an alphanumeric display for readout of measurement results.

5 Claims, 5 Drawing Sheets

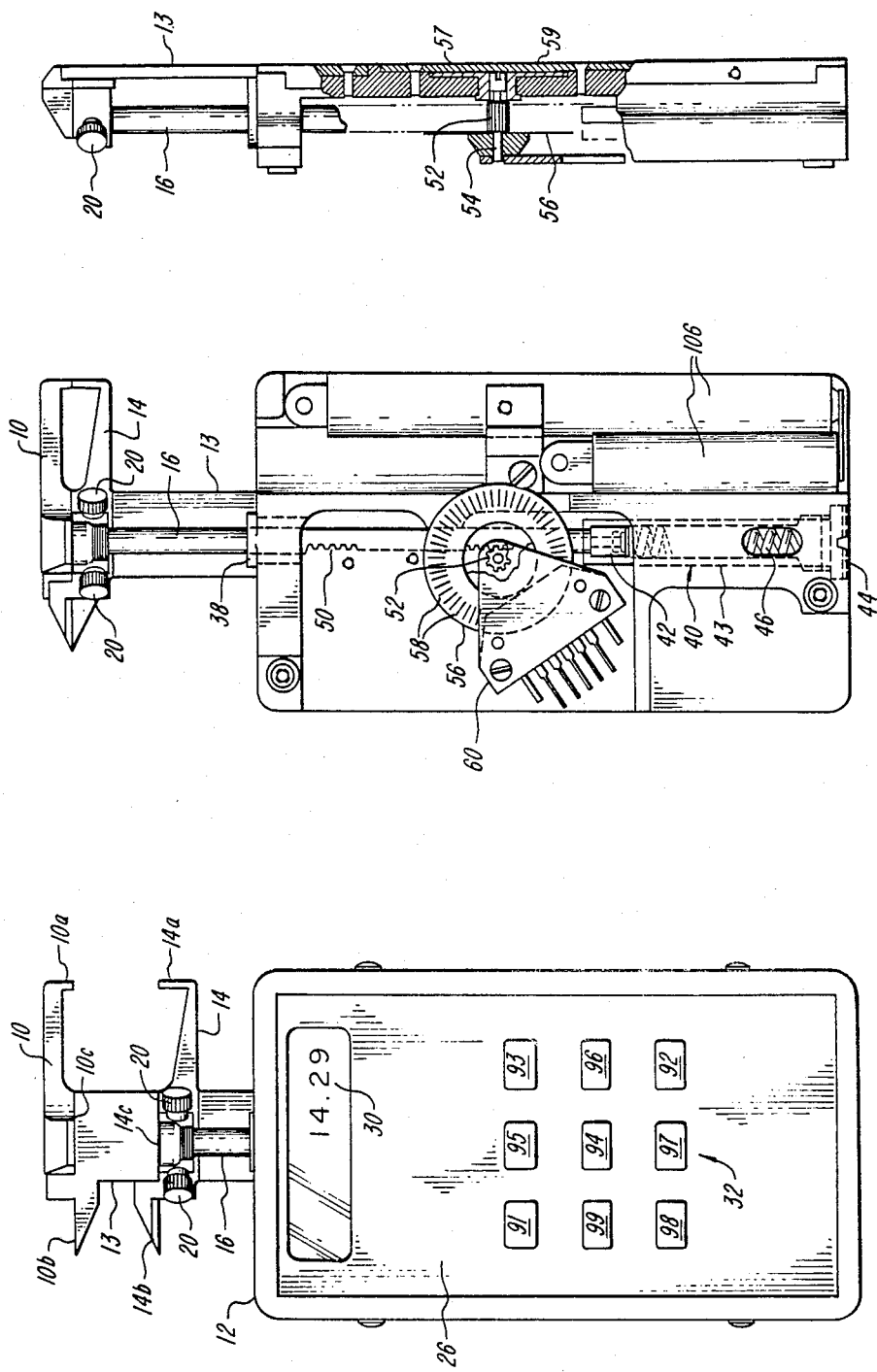

HANDHELD DIGITAL GEMSTONE MEASUREMENT APPARATUS

FIELD OF THE INVENTION

This invention relates to a handheld device for measuring the dimensions and calculating the weight of gemstones and, more particularly, to a gemstone measurement apparatus having high resolution, having damped, spring-loaded caliper jaws and providing automatic calculation of gemstone weight. Although the apparatus of the present invention is intended primarily for measurement of gemstones, it is not limited to such use. Furthermore, the apparatus is not limited to a handheld device.

BACKGROUND OF THE INVENTION

Gemstones such as diamonds are classified according to weight and shape. The weight is commonly determined by measuring one to three dimensions of the diamond with a set of calipers and referring to appropriate tables for the corresponding weight. The measurements can be taken with a standard set of mechanical calipers which utilize either spring-loaded caliper jaws or thumbwheel control of the caliper jaws.

A digital measuring instrument which can be used for measuring diamonds is disclosed in U.S. Pat. No. 4,570,349 issued Feb. 18, 1986 to Finkelman et al. The disclosed instrument utilizes a set of caliper jaws movable by a thumbwheel. As the caliper jaws move, a rack and pinion arrangement sends signals to a computer. The computer stores tables for estimation of the gemstone weight which is displayed on a digital display. Digital calipers are also disclosed in U.S. Pat. No. 4,229,883 issued Oct. 28, 1980 to Kobashi and U.S. Pat. No. 4,612,656 issued Sept. 16, 1986 to Suzuki et al. The Kobashi patent discloses a transparent linear scale having calibrations and a light emitter positioned to direct light through the scale. A light detector on the opposite side of the scale counts the calibration lines as the caliper jaws move so as to determine linear travel. Kobashi also refers to another caliper device wherein a first rotatable member is rotated relative to a second rotatable member, and bright and dark patterns of the moire fringe are sensed to measure dimension. The Suzuki et al patent discloses a linear magnetic scale.

The prior art gemstone measurement devices have various drawbacks and disadvantages. Mechanical scales and prior electronically sensed linear scales provide limited resolution, since linear scales which move the same distance as the caliper jaws cannot be expanded. Devices utilizing thumbwheels for caliper adjustment are inconvenient and relatively slow in use. Spring-loaded calipers of the so-called "Leveridge" type snap back to the closed position and often dislodge gemstones from the calipers. The use of tables for determining gemstone weight based on dimensional measurement is relatively inaccurate and requires inconvenient interpolation between tabulated points.

It is a general object of the present invention to provide improved measurement methods and apparatus.

It is a further object of the present invention to provide improved methods and apparatus for measuring the dimensions and the weight of gemstones.

It is another object of the present invention to provide a handheld digital gemstone measurement apparatus having high accuracy.

It is a further object of the present invention to provide a handheld digital gemstone measurement apparatus having caliper jaws which are convenient to use.

It is still another object of the present invention to provide a handheld digital gemstone measurement apparatus which avoids the necessity for reference to weight tables and interpolation between tabulated values.

It is yet another object of the present invention to provide a handheld digital gemstone measurement apparatus which is self-contained and includes a direct readout of gemstone weight.

It is yet another object of the present invention to provide handheld digital gemstone measurement apparatus including a pneumatic device for controlling movement of caliper jaws.

SUMMARY OF THE INVENTION

According to the present invention, these and other objects and advantages are achieved in a handheld digital gemstone measurement apparatus comprising a housing and a first caliper jaw fixed to the housing, a second caliper jaw linearly movable relative to the first caliper jaw, a rotary encoding wheel mounted for rotation relative to the housing and including a plurality of radial slots, means responsive to linear motion of the second caliper jaw for causing rotation of the encoding wheel, means for sensing rotation of the encoding wheel by optical sensing of the radial slots and providing a signal representative of the linear travel of the second caliper jaw to provide a dimensional measurement of a gemstine positioned between the caliper jaws, and means responsive to one or more dimensional measurements of the gemstone for calculating the weight thereof. The slotted rotary encoding wheel provides dimensional measurement resolution on the order of about 0.01 millimeter.

According to another aspect of the invention, there is provided a handheld digital gemstone measurement apparatus comprising a housing and a first caliper jaw fixed to the housing, a second caliper jaw linearly movable relative to the first caliper jaw, means for sensing movement of the second caliper jaw and providing a signal representative of linear travel of the second caliper jaw to provide a dimensional measurement of a gemstone positioned between the caliper jaws, and means responsive to one or more dimensional measurements of the gemstone for calculating the weight thereof, including means for selecting a gemstone shape from a group of programmed shapes, means responsive to the selected gemstone shape, the one or more dimensional measurements and a predetermined gemstone density for computing the gemstone weight, and means for displaying the gemstone weight. The calculating means preferably includes a keypad for selecting gemstone shape, a microprocessor for receiving inputs from the keypad and from the sensing means for computing the gemstone weight and for energizing the display means.

According to still another aspect of the invention, there is provided a handheld digital gemstone measurement apparatus comprising a housing and a first caliper jaw fixed to the housing, a second caliper jaw linearly movable relative to the first caliper jaw, a rotary encoding wheel mounted for rotation relative to the housing and including a plurality of radial slots, means responsive to linear motion of the second caliper jaw for causing rotation of the encoding wheel, means for sensing rotation of the encoding wheel by optical sensing of the radial slots and providing a signal representative of the linear travel of the second caliper jaw to provide a dimensional measurement of a gemstone positioned between the caliper jaws, and a spring-loaded pneumatic dashpot coupled between the housing and the second caliper jaw for urging the first and second caliper jaws together relatively slowly. The pneumatic dashpot provides caliper jaw action having a good feel and avoiding the disadvantages of thumbwheel caliper control and snap-action caliper jaws.

The measurement apparatus of the present invention, although intended primarily for measurement of gemstones, can be utilized for measurement of other objects. Furthermore, the features of the invention can be embodied in measurement apparatus which is not handheld. The calculating means can be configured to determine any desired quantity based on measured dimensions.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 1 is a front view of a handheld digital gemstone measurement apparatus in accordance with the present invention;

FIG. 2A is a cut-away view of the handheld digital gemstone measurement apparatus of FIG. 1;

FIG. 2B is a cross-sectional view of the handheld digital gemstone measurement apparatus illustrating the pinion gear and the rotary encoding wheel;

DETAILED DESCRIPTION OF THE INVENTION

Figure 3:
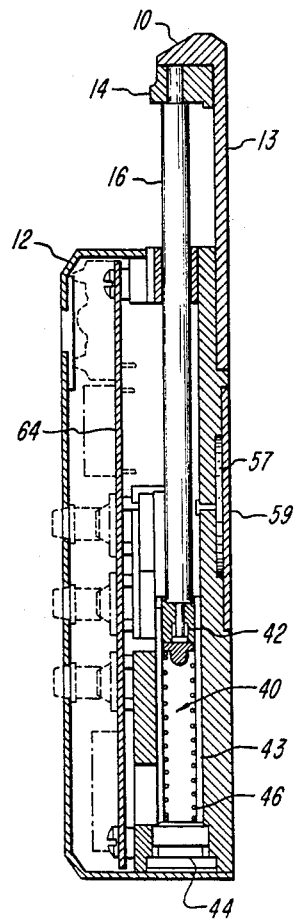
FIG. 3 is a cross-sectional view of the handheld digital gemstone measurement apparatus illustrating the printed circuit board and the pneumatic dashpot.

A handheld digital gemstone measurement apparatus in accordance with the present invention is shown in FIG. 1. A first caliper jaw 10 is affixed to a housing 12 by a rigid member 13, and a second caliper jaw 14 is movable relative to the first caliper jaw 10 and the housing 12. The caliper jaws 10 and 14 include opposed tips 10a, 14a for measuring gemstone dimensions, blades 10b, 14b for measuring the diameter of a ring, and flat surfaces 10c, 14c for measuring various dimensions. A shaft 16 is coupled at its upper end to the second caliper jaw 14 and extends through the top of housing 12 for activating a measurement device as described in detail hereinafter. Knurled screws 20 are threaded into the second caliper jaw 14 and provide means for manually separating the caliper jaws 10 and 14 during a measurement.

The housing 12 includes a front surface 26 with a numeric display 30 which is preferably an LED alphanumeric display, and a keypad 32 having nine momentary action key switches. The caliper jaws 10 and 14 are separated in FIG. 1. The apparatus of the present invention is suitable in size for handheld operation. It is similar in size and weight to a handheld calculator.

In order to determine the weight of a gemstone such as a diamond, the appropriate shape is selected via keypad 32, the caliper jaws 10 and 14 are separated manually and the diamond is placed between the caliper jaw tips 10a and 14a. The gemstone or other object being measured can also be placed between flat surfaces 10c and 14c, and blades 10b and 14b can be used for measuring the inside diameter of a ring or the like. The shaft 16 is spring-loaded as described hereinafter and urges the tips of the caliper jaws into contact with the diamond. The measurement is stored by the unit, and usually a second dimensional measurement is required. After all measurements have been taken, the unit performs a calculation using the measured values, the selected shape and the density of the diamond to provide a weight in carats. The weight is displayed on display 30. The unit is easy to use and provides rapid, accurate results. The operation is described in more detail hereinafter.

A cut-away view iof the gemstone measurement apparatus is shown in FIG. 2A. The shaft 16 slides through a bushing 38 in the top of housing 12 and is attached at its bottom end to a spring-loaded pneumatic dashpot 40. The dashpot 40 includes a piston 42 coupled to the shaft 16 and a pneumatic cylinder 43. A base 44 of dashpot 40 is coupled to housing 12. The piston 42 is located within pneumatic cylinder 43 and is urged upwardly by a spring 46 in cylinder 43. The damping rate of dashpot 40 is controlled by the clearance between the bore of cylinder 43 and piston 42.

When the second caliper jaw 14 is moved downward in preparation for making a measurement, the spring 46 is compressed and air is expelled from the cylinder 43. When the second caliper jaw 14 is released by the operator, spring 46 urges it back toward the closed position. Without the pneumatic cylinder 43, the second caliper jaw 14 would snap back to the closed position and could possibly dislodge the gemstone being measured. By using the pneumatic cylinder 43, air flows into the cylinder 43 at a controlled rate when caliper jaw 14 is released. As a result, the caliper jaw 14 slowly returns to the closed position, and the gemstone is unlikely to be dislodged or damaged. It will be understood that the dashpot 40 cooperates with the spring 46 to control the rate at which the caliper jaws 10, 14 close, while the spring 46 alone controls the force with which the jaws 10, 14 grip the gemstone.

The shaft 16 is provided with a rack 50 of gear teeth along a portion of its length inside housing 12, and a pinion gear 52 is mounted to a shaft 54 (FIG. 2B) with its teeth engaged with the teeth of rack 50. The shaft 54 is rotatably mounted to housing 12 so that the pinion gear 52 can rotate as the shaft 16 moves along its axis. Also attached to the shaft 54 is a rotary encoding wheel 56 having a plurality of radial slots 58 located near its outer periphery. As the second caliper jaw 14 moves upwardly or downwardly, the encoding wheel 56 is caused by the rack 50 and the pinion gear 52 to rotate.

A spirally-wound spring 57 of the clock spring type is adjustably fixed to the housing 12 by a pin (not shown) in a circular rear cover plate 59. The pin engages a hook in the outer end of spring 57. The inner end of spring 57 engages a slot in the bottom end of shaft 54. Preload is applied by securing the spring 57 to the shaft 54 and then rotating the cover plate 59 in 90° increments. The cover plate 59 is attached to housing 12 by four equallyspaced screws (not shown). The spring 57 provides an anti-backlash feature which maintains the pinion gear 52 against one side of the teeth in rack 50 in order to avoid reversing errors. The spring 57 urges the shaft 16 in the same direction as dashpot-mounted spring 46 and therefore acts as a backup in the event that spring 46 breaks.

A sensing assembly 60 is mounted in a fixed position adjacent to the encoding wheel 56 for sensing rotation thereof by optically sensing the radial slots 58. In a preferred embodiment, the encoding wheel 56 is a type HEDS5000 and the sensing assembly 60 is a type HEDS9000 both sold by Hewlett-Packard Company. The sensing assembly 60 includes a light source positioned on one side of the encoding wheel 56 and a light sensor positioned on the opposite side of the encoding wheel 56. The light source and the light sensor are aligned with the radial slots 58 and with each other so that a light beam is directed through one of the slots 58 at the light sensor. As the encoding wheel 56 rotates, the light beam is broken by the portion of the wheel between the slots 58, and the light sensor provides a pulse for each slot that passes it. A second light source and light sensor displaced from the first provides phase-shifted pulses and permits the direction of movement to be determined. By appropriate processing of the sensor output signals, the angular displacement and direction of encoding wheel 56 movement can be sensed, and the angular wheel displacement can be related to linear displacement of shaft 16 and caliper jaw 14.

The preferred encoding wheel includes 500 radial slots 58. The gearing arrangement of the rack 50 and the pinion gear 52 is such that 10 millimeters of linear travel of shaft 16 results in one complete revolution of encoding wheel 56. The 500 slots 58 generate 500 pulses for one rotation. As described hereinafter, both the leading and the trailing edges of each pulse are sensed and utilized to generate counts which represent caliper jaw movement. As a result, one thousand counts are produced by one revolution of the encoding wheel 56, and the resolution is 0.01 millimeter per count. The counts are supplied to a microprocessor for recording and processing as described hereinafter.

Figure 4:
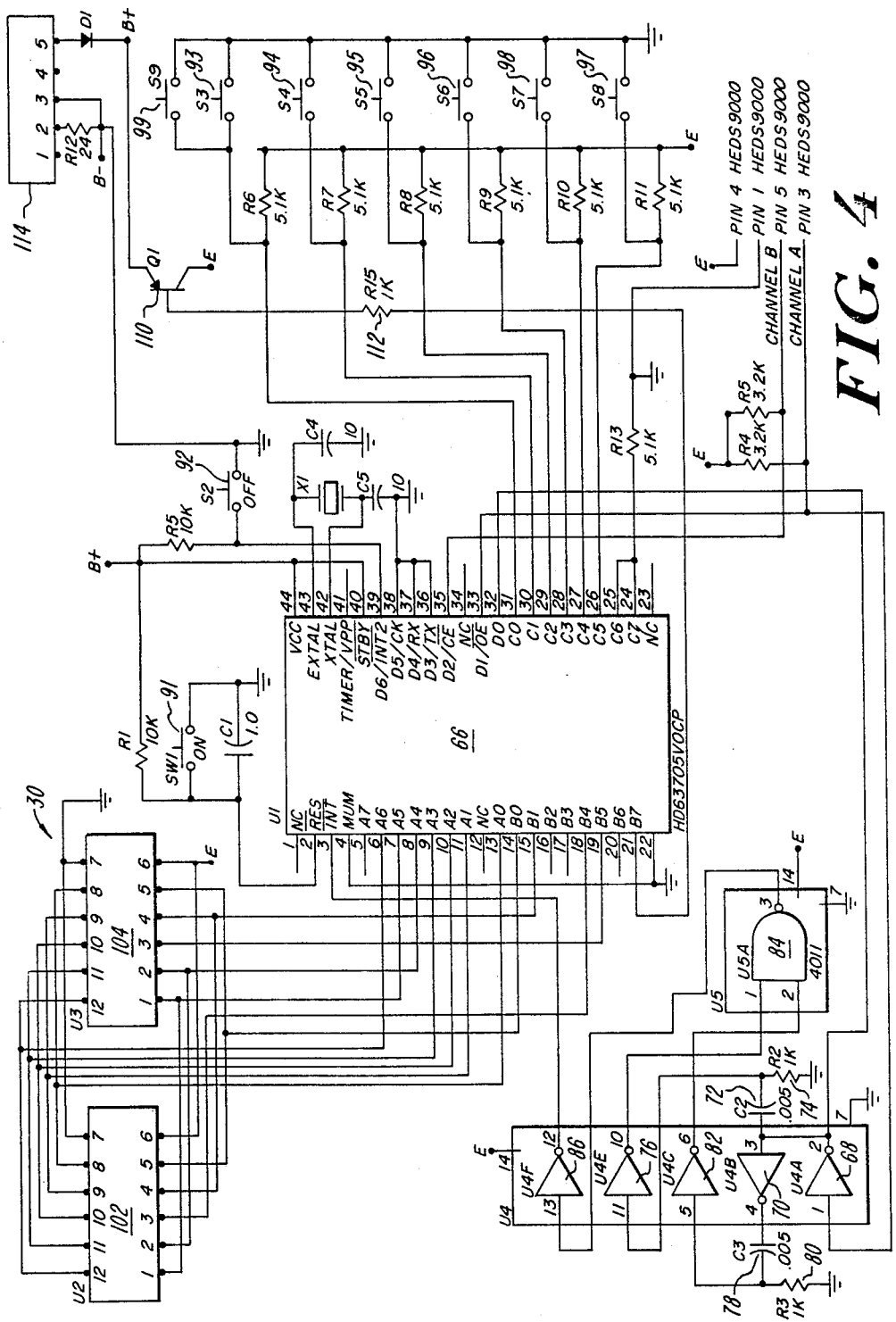
FIG. 4 is a schematic diagram of the circuitry for the handheld digital gemstone measurement apparatus of the present invention.

As shown in FIG. 3, a printed circuit board 64 is mounted within the housing and contains the necessary circuitry for operation of the unit. A schematic diagram of the circuit board is shown in FIG. 4. A microprocessor 66, which can be a Hitachi type HD63705V0CP, receives from the sensing assembly 60 inputs which represent movement of caliper jaw 14, receives inputs from keypad 32 and provides outputs to display 30.

The outputs of the sensing assembly 60 are designated in FIG. 4 as CHANNEL A and CHANNEL B signals. The CHANNEL A and CHANNEL B signals include a pulse each time one of the radial slots 58 on encoding wheel 56 passes the associated light sensor. The CHANNEL A and CHANNEL B signals are 90° out of phase to permit a determination of the direction of rotation of encoding wheel 56. The CHANNEL A signal is provided through an inverter 68 to the input of an inverter 70 and to microprocessor pin 32, an input terminal. The output of inverter 68 is also coupled through a high pass filter comprising a series capacitor 72 and a shunt resistor 74 to the input of inverter 76. The output of inverter 70 is coupled through a high pass filter comprising a series capacitor 78 and a shunt resistor 80 to the input of an inverter 82. The outputs of inverters 76 and 82 are coupled to the inputs of a logic gate 84. The output of logic gate 84 is coupled through an inverter 86 to microprocessor pin 3, an interrupt input. The CHANNEL A and CHANNEL B signals are also coupled to microprocessor input pins 33 and 35, respectively.

In operation, both the leading and trailing edges of the CHANNEL A pulse generate an interrupt signal to pin 3 of microprocessor 66. Each time an interrupt is received by microprocessor 66, a count is recorded in accordance with Table 1. Thus, as encoding wheel 56 rotates, a pulse is provided on each of CHANNEL A and CHANNEL B signals for each radial slot 58 that passes the sensing assembly 60. The use of the CHANNEL A and CHANNEL B signals insures counting in the proper direction, since it will be understood that the caliper jaw 14 can be moved in either direction. As described above, each count recorded by microprocessor 66 represents a 0.01 millimeter movement by caliper jaw 14. Thus, the total number of counts between a closed position or other zero position and a position in contact with a gemstone represents the desired dimension.

TABLE 1

| CHANNEL A | CHANNEL A | CHANNEL B | OPERATION |
|---|---|---|---|
| 0 | 1 | 0 | Count up |
| 1 | 0 | 1 | Count up |
| 0 | 1 | 1 | Count down |
| 1 | 0 | 0 | Count down |

The keypad 32 includes key switches 91, 92, 93, 94, 95, 96, 97, 98 and 99 coupled to pins 2, 39, 31, 30, 29, 28, 26, 27 and 31, respectively, of microprocessor 66 for controlling its operation as describes hereinafter. (Switches 93 and 99 are coupled in parallel to pin 31.) The display 30, including LED display circuits 102, 104 which can be type HPDL1414 manufactured by Hewlett-Packard, are coupled to the microprocessor 66 in conventional manner for display of selected output data.

The circuitry of FIG. 4 receives operating power from three 1.2 volt batteries 106 (FIG. 2A) coupled in series. The battery voltage +B is coupled through a transistor 110 to provide a switched voltage E for operating the display circuits 102, 104, the switches 91-99, inverters 68, 70, 76, 82, 86 and gate 84. The base of transistor 110 is coupled through a resistor 112 to microprocessor pin 21. With this configuration, all of the circuitry, except the microprocessor which is placed in low power mode, can be turned off to save power when the unit has not been used for a predetermined time. A plug 114 permits connection of an external battery charger for charging of batteries 106.

The function keys 91–99 are used to control the operation of the unit. The functions are listed below.

| Ref. No. | Function | Description |
|---|---|---|
| 91 | ON KEY | Used to turn the unit on. |
| 92 | OFF KEY | Used to turn the unit off. The unit has an automatic shut-off feature which supplements this key. |
| 93 99 | → KEY | The RIGHT ARROW keys are used to progress through the measuring session. Since this function is used most when taking measurements, two keys are used to facilitate both left and right handed operation. More detail is |

| Ref. No. | Function | Description |
|---|---|---|
| | | given hereinafter. |
| 94 | ← KEY | The LEFT ARROW key is used to reverse or back up during the measuring session. More detail is given hereinafter. |
| 95 | SELECT KEY | The SELECT key is used to select the display functions and to select the caliper readings to be used in the calculations. |
| 96 | RESET KEY | The RESET key is used to set the caliper reading to .00 mm. This can be done with the caliper jaws completely closed in order to recalibrate prior to a reading or with the caliper jaws set to a desired spacing to obtain relative readings. |
| 97 | THIN GIRDLE KEY | This key is used to change the calculated value of the diamond (gemstone) to the value designated for a thin girdle. |
| 98 | THICK GIRDLE KEY | This key is used to change the calculated value of the diamond (gemstone) to the value designated for a thick girdle. |

When the unit is first turned on by pressing the ON key, the word ROUND will show on the display. This is the starting point of the SELECT mode at which the operator selects the cut of the stone to be measured. Table 2 gives a listing of the SELECT options.

TABLE 2

| 1. ROUND | 7. SQUARE |
|---|---|
| 2. OFF ROUND | 8. SMALL SQUARE |
| 3. MARQUISE | 9. MELEE |
| 4. PRINCESS | 10. PEARL |
| 5. PEAR | 11. RING SIZE |
| 6. OVAL | 12. CALIPER |

The last three in the list do not refer to cuts of diamonds or gemstones. PEARL is used to measure the size of pearls, RING SIZE is used to measure ring sizes and CALIPER is an option which permits the unit to be used for measurements when calculations are not required.

To select the desired cut, the operator simply presses either the RIGHT ARROW or LEFT ARROW key until the desired cut appears in the display. The ability to scroll through the selection list in either direction saves times. The RIGHT ARROW or LEFT ARROW key may be held down during the selection process in which case the listing will automatically scroll on the display, or the operator may hasten the selection by successively depressing the key.

When the desired cut is shown on the display, the SELECT key is pressed. This indicates the operator's choice and places the unit in the measurement mode. The unit immediately responds with a request for a parameter measurement. This is done by blinking the parameter requested on the display for a few seconds, (i.e., if ROUND had been selected, the word DIAMETER would blink on the display). The unit then switches to the CALIPER mode and waits for the measurement to be made.

The caliper reading should start at 0.00 mm with the caliper jaws closed. If another reading is displayed, the RESET key is pressed. The requested measurement is made and while the reading is indicated on the display, the RIGHT ARROW key is pressed. The unit records the reading and then requests the next measurement to be taken. The process is repeated until the unit has enough information to calculate the size of the diamond or gemstone. From 1 to 3 parameters will be required, as indicated in Table 3.

The approximate weight of the diamond or gemstone is now calculated and appears on the display almost immediately after the last measurement. The displayed value is for a diamond having an average girdle thickness. The operator at this time must input to the unit the girdle thickness. There are three choices:

1. Accept the average girdle weight shown.
2. Press the THIN GIRDLE key and the display will change to show the weight for a thin girdle.
3. Press the THICK GIRDLE key and the display will change to show the weight for a thick girdle.

Up to this point, the unit assumes that the measurements taken relate to a diamond. If this is so, then the measurement session is complete. The operator may either terminate by pressing the OFF key or proceed to another measurement session by pressing the LEFT ARROW key which places the unit back into the select mode with the display showing the last selection.

To measure the approximate weight of a ruby, sapphire or emerald, the measurement session is performed exactly as for a diamond. When the weight has been calculated for a diamond and the girdle thickness has been entered, the RIGHT ARROW key is pressed. RUBY blinks on the display for a few seconds followed by the approximate weight of a ruby cut like a diamond with the selected girdle thickness. Similarly, pressing the RIGHT ARROW key again gives the results for sapphire and a third time for emerald.

For measuring pearls, only one measurement is required and the result is displayed in grains.

To measure ring size, the ring is placed over the extended caliper jaws, the caliper is opened to the limit of the ring to obtain a caliper reading and then the RIGHT ARROW key is pressed. The ring size is displayed.

TABLE 3

| MEASUREMENTS REQUIRED | |
|---|---|
| SELECTION | MEASUREMENTS |
| 1. ROUND | DIAMETER |
| | DEPTH |
| 2. OFF ROUND | DIA.1 (larger diameter) |
| | DIA.2 (smaller diameter) |
| | DEPTH |
| 3. MARQUISE | LENGTH |
| PRINCESS | WIDTH |
| PEAR | DEPTH |
| OVAL | |
| 4. SQUARE (baguettes, squares, emerald cuts) | LENGTH |
| | WIDTH |
| | DEPTH |
| 5. SMALL SQUARE | LENGTH |
| | WIDTH |
| 6. MELEE | DIAMETER |
| 7. PEARL | DIAMETER |

Figure 5A:
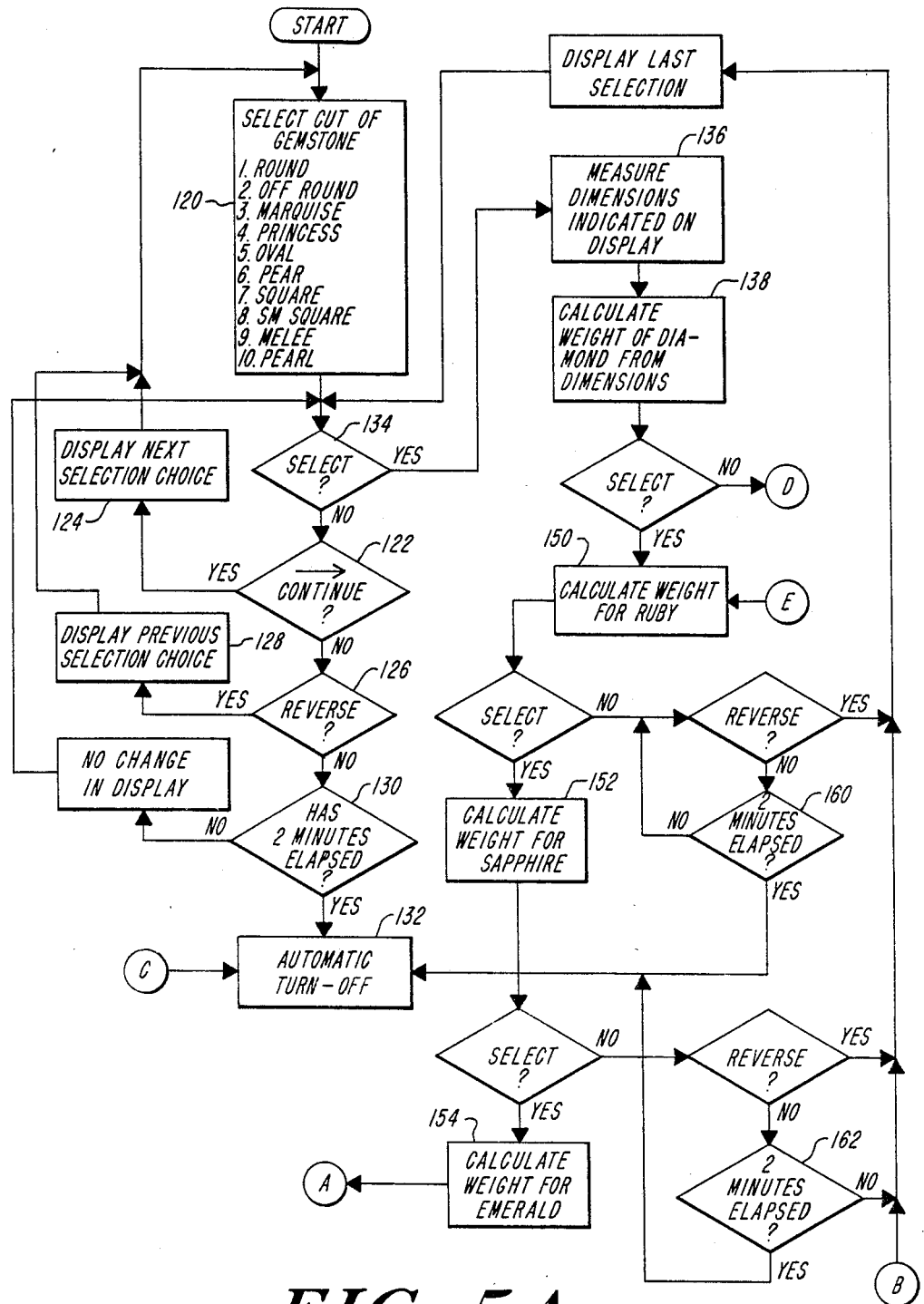
FIGS. 5A and 5B include a flow chart illustrating the operation of the handheld digital gemstone measurement apparatus of the present invention.
Figure 5B:
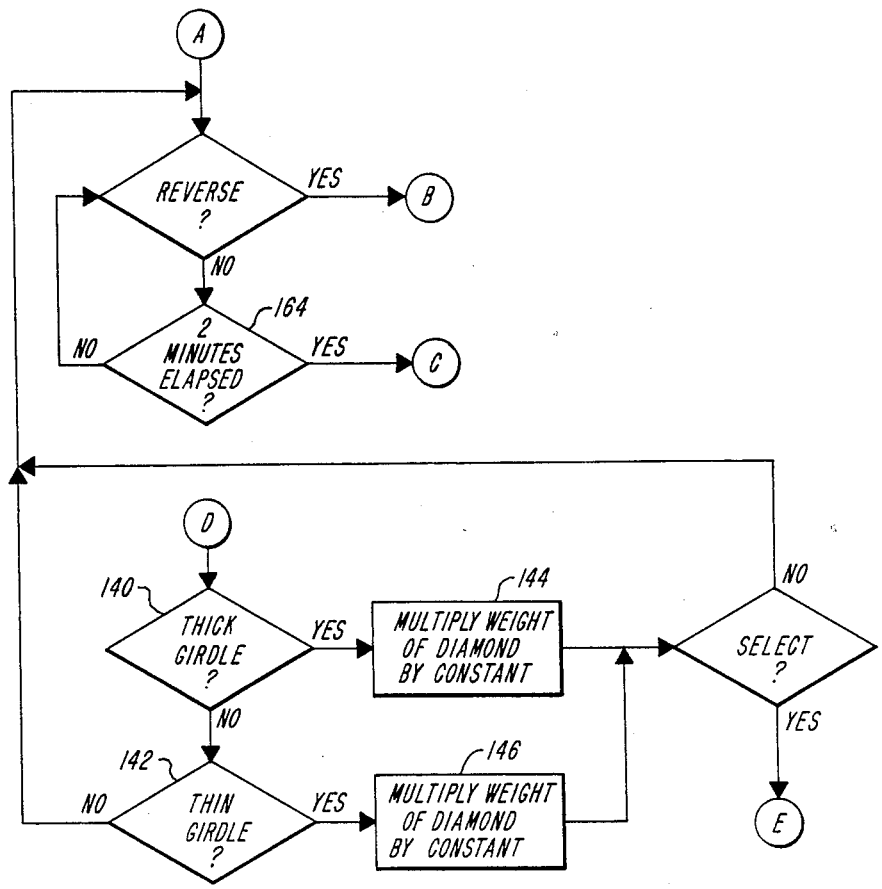

The software contained in the microprocessor 66 for performing the above-described operation is illustrated in flowchart format in FIGS. 5A and 5B. After starting, a gemstone cut is selected from a predetermined list 120. When the desired cut is not displayed, the operator presses the RIGHT ARROW key 93 in step 122, causing the next selection to be displayed in step 124. When the reverse or LEFT ARROW 94 key is pressed in step 126, the previous selection is displayed in step 128. If two minutes have elapsed as determined in step 130, all of the circuitry, except the microprocessor which is placed in low power mode, is automatically turned off in step 132 as described hereinabove. When the desired cut is displayed, the operator presses the SELECT key 95 in step 134, and the system prompts the operator to make the necessary measurements in step 136. When the measurements are completed, the weight of a diamond is calculated in step 138 from the dimensions and a formula for the selected shape. The formulas for the various gemstone shapes are given in Table 4.

TABLE 4

| SHAPE | FORMULA |
| --- | --- |
| 1. ROUND | $(DIAMETER)^2(DEPTH)(.0063)$ |
| 2. OFF ROUND | $[(DIAMETER\ 1 + DIAMETER\ 2)/2]^2(DEPTH)(.0063)$ |
| 3. MELEE | $(DIAMETER)^2(.42\ DIAMETER)(.0063)$ |
| 4. MARQUISE | $[(3 \cdot LENGTH - WIDTH)/3](DEPTH)(.0063)$ |
| 5. PRINCESS | $(SIDE)^2(DEPTH)(.0063)$ |
| 6. OVAL | $[LENGTH + WIDTH)/2]^2(DEPTH)(.0063)$ |
| 7. PEAR | $(LENGTH)(WIDTH)(DEPTH)(.0063)$ |
| 8. SQUARE | $(DEPTH)[(3 \cdot LENGTH - WIDTH)/3](.0063)$ |
| 9. SMALL SQUARE | $(WIDTH)^2(K)$ |
| 10. PEARL | $(DIAMETER)^3(.0283)$(Result is in grains) |
| 11. RING SIZE | $(CALIPER\ READING - CONSTANT)/12$ |

After the calculation has been completed, the operator can select a thick girdle (key 98) in step 140 or a thin girdle (key 97) in step 142. When a thick girdle or a thin girdle is selected, the calculated weight is multiplied by a constant in steps 144 or 146 to provide the final weight reading for a diamond. When the weight is desired for a ruby, a sapphire or an emerald, these values are calculated in steps 150, 152 and 154, respectively. After the various calculations have been completed, the operator can return to the list 120. If no selection is made, steps 160, 162 and 164 determine when two minutes have elapsed. When two minutes elapse without an entry by the operator, the automatic turnoff procedure 132 is invoked.

The measurement apparatus described herein can be utilized for measurement of objects other than gemstones. When the density and shape of the objects are known, the weight can also be determined with the measurement apparatus of the invention. The microprocessor can be reprogrammed to include different or additional shapes and densities. Furthermore, the microprocessor can be reprogrammed for calculation of other selected parameters based on measured dimensions. Finally, the measurement apparatus of the present invention is not necessarily handheld, but can be constructed as a fixed unit.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A handheld digital gemstone measurement apparatus comprising:
    a housing and a first caliper jaw fixed to the housing;
    a second caliper jaw linearly movable relative to the first caliper jaw;
    means for sensing movement of said second caliper jaw and providing a signal representative of the linear travel of said second caliper jaw to provide a dimensional measurement of a gemstone positioned between said caliper jaws; and
    means responsive to one or more dimensional measurements of the gemstone for calculating the weight thereof, including
        means for selecting a gemstone shape from a group of preprogrammed shapes, said selected gemstone shape having an associated formula for calculation of gemstone weight,
        means for substituting the one or more dimensional measurements into the formula associated with the selected gemstone shape and calculating the gemstone weight from the formula, and
        means for displaying the gemstone weight.

2. Gemstone measurement apparatus as defined in claim 1 wherein said calculating means further includes means for selecting a gemstone density from a group of preprogrammed densities and substituting the selected gemstone density into the formula associated with the selected gemstone shape.

3. Gemstone measurement apparatus as defined in claim 1 wherein said calculating means includes a keypad for selecting a gemstone shape and a microprocessor for receiving inputs from said keypad and from said sensing means, for computing the gemstone weight and for energizing said display means.

4. Gemstone measurement apparatus as defined in claim 3 including means for resetting said dimensional measurement at any selected position of said second caliper jaw.

5. A handheld digital gemstone measurement apparatus comprising:
    a housing and a first caliper jaw fixed to the housing;
    a second caliper jaw linearly movable relative to the first caliper jaw;
    a rotary encoding wheel mounted for rotation relative to said housing and including a plurality of radial slots;
    means responsive to linear motion of said second caliper jaw for causing rotation of said encoding wheel;
    means for sensing rotation of said encoding wheel by optical sensing of said radial slots and providing a signal representative of the linear travel of said second caliper jaw to provide a dimensional measurement of a gemstone positioned between said caliper jaws;
    a spring-loaded pneumatic dashpot coupled between said housing and said second caliper jaw for urging said first and second caliper jaws together relatively slowly; and
    means responsive to one or more dimensional measurements of the gemstone for calculating the weight thereof, including means for selecting a gemstone shape from a group of preprogrammed shapes, said selected gemstone shape having an associated formula for calculation of gemstone weight, means for selecting a gemstone density from a group of preprogrammed densities, means for substituting the one or more dimensional measurements and the selected gemstone density into the formula associated with the selected gemstone shape and calculating the gemstone weight from the formula, and means for displaying the calculated gemstone weight.

* * * * *